United States Patent [19]

Nakatani

[11] 4,029,279

[45] June 14, 1977

[54] DEVICE FOR HOLDING EACH OF THE LEGS OF A TRIPOD

[76] Inventor: Koma Nakatani, 81, Sakae-cho, Kodaira, Tokyo, Japan

[22] Filed: June 21, 1976

[21] Appl. No.: 698,163

[30] Foreign Application Priority Data

July 25, 1975 Japan .................... 50-103687[U]

[52] U.S. Cl. ........................ 248/188.5; 248/337; 403/109

[51] Int. Cl.² .................. A45B 1/04; A45B 19/04; F16B 7/14

[58] Field of Search ............. 248/412, 188.5, 333, 248/336, 337, 354 R; 403/109, 110, 104, 105, 106, 107, 331

[56] References Cited

UNITED STATES PATENTS

| 104,767 | 6/1870 | Pusey | 403/107 X |
| 829,892 | 8/1906 | Rieflin | 248/337 |
| 2,262,939 | 11/1941 | Howard | 248/188.5 |
| 3,589,757 | 6/1971 | Mooney | 248/188.5 |

FOREIGN PATENTS OR APPLICATIONS 861,930 11/1952 Germany ................... 248/188.5

*Primary Examiner*—J. Franklin Foss
*Attorney, Agent, or Firm*—James E. Nilles

[57] ABSTRACT

A holding device for use in the tripod comprising at least two rods arranged in telescopic manner and provided with a through-hole at the lower end thereof, fastening levers arranged to be pressed against a face of each of the inner rods through the through-hole.

3 Claims, 2 Drawing Figures

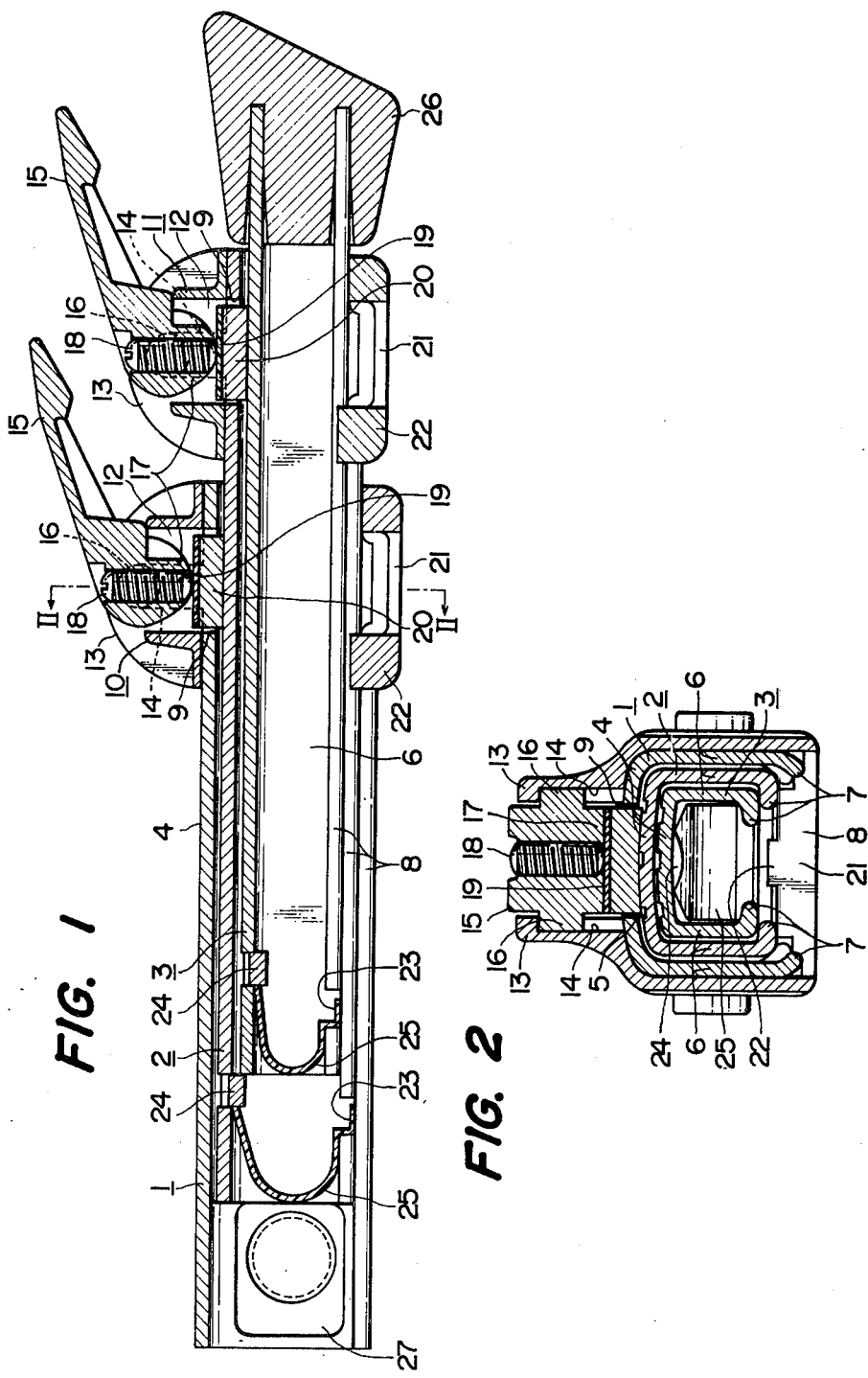

DEVICE FOR HOLDING EACH OF THE LEGS OF A TRIPOD

The present invention relates to a device for holding each of the legs of a tripod and, more particularly, to a device for holding at a predetermined length each of plural rods which are telescopically arranged to comprise a leg of the tripod.

As devices of this kind, there have been conventionally proposed the one in which each of the telescopic rods is fixedly held relative to its outer rod at its lower end and at its one side by a fastening member such as screw and the one in which each of the telescopic rods is fixedly held through a pressing plate by turning a fastening lever. However, the former could not attain a speedy fastening operation due to the screws while the latter could attain an easy fastening operation but had such a drawback that the construction enabling the fastening lever to be attached is more complicated than that in the case of using the screws, thus making the assembly and manufacture thereof more troublesome.

A primary object of the present invention is to provide a holding device of which operation is easy and accurate and of which assembly and manufacture are easy.

Other object of the present invention is to provide a holding device wherein a sliding member is arranged in a through-hole of each of the rods so that the fastening operation may be more securely attained through the pressing portion of a fastening lever.

Further object of the present invention is to provide a holding device wherein an adjusting screw is threaded into the pressing portion of the fastening lever so that the pressing force applied to the inner rod may be adjusted by the adjusting screw to thereby allow the inner rod to be always pressed relative to the outer rod with a proper force.

Still further object of the present invention is to provide a holding device enabling the arrangement of engaging projections and resilient stopping plates to be extremely simplified wherein an engaging projection is provided in a holding frame arranged at the lower end of each of the rods except the one of the smallest diameter and into the upper end of each of the outer rods corresponding to the engaging projection is fitted a resilient stopping plate so as to be brought into engagement with the engaging projection when each of the rods is telescopically extended, thus preventing each of the inner rods from coming off from each of the outer rods.

Still further object of the present invention is to provide a holding device wherein each of the inner rods can be prevented from coming off from each of the outer rods by the combination of the engaging projection provided at the lower end of each of the rods and the resilient stopping plate provided in the upper end of each of the outer rods corresponding to the engaging projection, said engaging projection being ready by fitting the holding frame around the lower end of each of the rods and said resilient stopping plate being also ready by being fitted into the space between the projection and the engaging groove provided in the upper end of each of the rods, so that the attachment of the engaging projections and the resilient stopping plates can be more easily attained than that of these members using screws, thus making extremely easy the assembly and manufacture of the device.

The present invention is therefore intended to provide a device for holding each of the legs of the tripod wherein at least two or more rods are arranged in telescopic manner, each of the rods having a similar section and each of the rods except the one of the smallest diameter which is contained in the innermost side being provided at the lower end thereof with a through-hole, onto which a holding frame is fitted in such a manner that the frame encloses the outer circumference of the rod at a position at which the through-hole is provided, and integral to both sides of the holding frame are formed attaching members, in each of which is formed an engaging groove extending from the inner center of the attaching member to the holding frame, and into the grooves provided in both sides of the attaching member are rotatably engaged engaging pins projecting from both sides of a fastening lever, integral to which is formed a pressing portion which is to be pressed against a face of the inner rod through the through-hole by turning the fastening lever.

According to the present invention, each of the rods can be easily and fixedly held by turning each of the fastening levers provided at the lower ends of the rods to hold each of the inner rods at a predetermined length and assembly of the device can be attained by engaging the engaging pins which project from both sides of the fastening lever with the engaging grooves provided in the attaching members arranged on both sides of each of the holding frames, so that the number of parts used can be reduced and the process is simplified to make easy the assembling and manufacturing as well as dismantling and repairing of the device.

The other objects as well as the merits of the present invention will be apparent from the following description with reference to the accompanying drawing, in which FIG. 1 is a longitudinal section showing an embodiment of the present invention; and FIG. 2 is a view taken along the line II—II in FIG. 1.

In the Figures numerals 1, 2 and 3 represent rods, each having a similar section and being arranged in telescopic manner, and each of the rods is formed to have a section of U by forming an arcuate face 4 as an outer face on which plural grooves 5 are provided in the longitudinal direction thereof, bending both sides of the face 4 inwardly to form side faces 6 perpendicular to the face 4 and further bending end edges of side faces 6 inwardly to form engaging rims 7 between which is left a groove 8 extending in the longitudinal direction of the rod.

In the lower end of the face 4 of each of the rods 1 and 2 except the one 3 of the smallest diameter which is contained in the innermost side is provided a through-hole 9 of square shape. Around the outer circumferences of the lower ends of the rods 1 and 2 at which the through-hole are provided are attached holding frames 10 and 11. In the outer walls of the holding frames 10 and 11 corresponding to the through-holes 9 are provided openings 12 and integral to both sides of the holding frames 10 and 11 are formed attaching members 13 of semicircular, which are formed engaging grooves 14, each extending from the inner center of the member 13 to the holding frame. Into these engaging grooves 14 provided in both sides of the attaching member 13 are freely rotatably engaged engaging pins 16 which project from both sides of a fastening lever 15. Between the engaging pins 16 of the fastening lever 15 is projected a cam portion or a pressing portion 17 which is rotated eccentrically with respect to the through-hole 9 by the lever 15 and an adjusting screw 18 is threaded through the center of the pressing portion 17. Further, in the through-hole 9 of each of the rods 1 and 2 is arranged a sliding member 20 of which inner face is slidably contacted with the face 4 of each of the rods 2 and 3 and to the outer face of which is adhered a resilient member 19 contacting with the pressing portion 17.

In the outer wall of each of the holding frames 10 and 11 opposing to the opening 12 is provided an opening 21 through which an engaging projection 22 is projected into the longitudinal groove 8 of each of the rods 2 and 3, said engaging projection being formed integral to each of the holding frames 10 and 11.

At the upper portion of each of the rods 2 and 3 except the one 1 of the largest diameter which is located in the outermost side, that is, at the both engaging rims 7 are provided engaging grooves 23 which face each other, and a part of the face 4 is projected inwardly so as to form a projection 24. An end of a resilient stopping plate 25 of U shape such as leaf spring is engaged with the projection 24 while the other end thereof is engaged with the engaging grooves 23.

Further, in these Figures numeral 26 represents a leg seat attached to the lower end of the rod 3 and numeral 27 a connection to the pan head.

There will be now described how the embodiment of the present invention is assembled and operated.

The fastening lever 15 is inserted into the opening 21 of each of the holding frames 10 and 11 in such a manner that the engaging pins 16 projected from both sides of the fastening lever 15 are engaged with the engaging grooves 14, and under a condition that the fastening lever 15 is turned counterclockwise and held vertically, the sliding member 20 is located in the opening 12 of each of the holding frames 10 and 11. The holding frames 10 and 11 kept in this state are attached to the lower ends of the rods 1 and 2, respectively, in such a manner that the opening 12 of each of the holding frames 10 and 11 is faced to the through-hole 9 of each of the rods 1 and 2. As a result, the sliding member 20 located to face the opening 12 of each of the holding frames 10 and 11 comes into the through-hole 9 of each of the rods 1 and 2 to contact with each of the inner rods 2 and 3, respectively. The resilient stopping plate 25 bent inwardly is inserted into each of the rods 2 and 3 from the upper end thereof in such a manner that the one end of the plate 25 is engaged with the projection 24 while both sides of the other end thereof are engaged with the engaging grooves 23. Therefore, this resilient stopping plate 25 is held at the upper end of each of the rods 2 and 3 due to the resiliency thereof.

When the fastening lever 15 is turned to a state as shown in FIG. 1 under a condition that the rods 2 and 3 are extended to a predetermined length, respectively, the sliding member 20 is pressed against the face 4 of each of the rods 2 and 3 through the pressing portion 17 of the fastening lever 15 and through the adjusting screw 18. Accordingly, each of the rods 2 and 3 is fixedly held with its face 4 being pressed by the sliding member 20 and with its engaging rims 7 being held by those of the rods 1 and 2. The pressing force applied to the sliding member 20 can be adjusted by adjusting the extent at which the adjusting screw 18 projects from the pressing portion 17, so that the rods 2 and 3 may be held with a pressing force always kept at a predetermined range.

When the rods 2 and 3 are extended to the maximum extent, the resilient engaging plate 25 provided at the upper end of each of the rods 2 and 3 is brought into contact with the engaging projection 22 of each of the holding frames 10 and 11 which projects into the longitudinal groove 8 of each of the rods 2 and 3, thus preventing each of the inner rods from coming off from each of the outer rods.

What is claimed is:

1. A holding device for use in the tripod comprising:
   at least two rods, each having a similar section and each of the rods being arranged in telescopic manner and provided with a through-hole at the lower end thereof except the one of the smallest diameter which is contained in the inner-most side;
   holding frames, each being attached around the outer circumference of the lower end of each of the rods so as to face the through-hole;
   attaching members formed integral to both sides of the holding frame;
   engaging grooves formed in the attaching members and extending from the inner center of the attaching member to the holding frame, respectively;
   fastening levers, each having engaging pins projected from both sides thereof, and said engaging pins being freely rotatably engaged with the engaging grooves;
   pressing portions, each being formed integral to each of the fastening levers and arranged to be pressed against a face of each of the inner rods through the through-hole by turning the fastening lever; and
   an adjusting screw threadably engaged in each of said pressing portions for adjustable abutment against the respective face of said inner rods.

2. A holding device for use in the tripod according to claim 1, further including a sliding member arranged in the through-hole of each of the rods in such a manner that the inner face of the sliding member is slidably contacted with the outer circumference of each of the inner rods while the outer face thereof is contacted with the pressing portion of the fastening lever.

3. A holding device for use in the tripod comprising:
   at least two rods, each having a similar section and each of the rods being arranged in telescopic manner and provided with a groove extending in the longitudinal direction thereof;
   holding frames, each being attached around the lower end of each of the rods except the one of the smallest diameter which is located in the innermost side and having an engaging projection projecting into the longitudinal groove of the inner rod;
   an engaging groove and a projection provided on both sides of each of the rods except the one of the largest diameter which is located in the outermost side, respectively; and
   resilient stopping plates, the one end of each of which is engaged with the projection while the other end thereof with the engaging groove;
   wherein when each of the rods is extended the resilient stopping plate is brought into contact with the engaging projection so that each of the rods may be prevented from coming off.

* * * * *